INVENTORS
STANFORD B. SPRACKLEN
DONALD N. CAMPBELL
BY Gerald R. O'Brien Jr.
ATTORNEY INVENTORS
STANFORD B. SPRACKLEN
DONALD N. CAMPBELL
BY Gerald R. O'Brien Jr.
ATTORNEY

United States Patent Office 2,747,455
Patented May 29, 1956

2,747,455

DIFFERENTIAL REFRACTOMETER

Stanford B. Spracklen and Donald N. Campbell, St. Albans, W. Va., assignors to Union Carbide and Carbon Corporation, a corporation of New York Application August 20, 1954, Serial No. 451,279

11 Claims. (Cl. 88—14)

The present invention relates to differential refractometers and, more particularly, to recording differential refractometers for continuous plant stream monitoring.

The average coefficient expressing the variation of refractive index ($n$) in hydrocarbon liquids with respect to temperature is: 0.0004 $n/°$ C. As a consequence, it is apparent that, in order to continuously and reproducibly measure the refractive index of a liquid to the sixth decimal place, the temperature of the liquid must be controlled to better than $\pm 0.01°$ C. or a refractometer must be provided in which this temperature effect is eliminated or reduced to a negligible factor.

Heretofore, no commercially available differential refractometer exists which is capable of continuously monitoring a plant stream and recording refractive index differences within the limits of measurement set forth hereinabove.

It is the main object of the present invention to provide a recording differential refractometer for continuous plant stream monitoring which is capable of reproducibly measuring the refractive index of a liquid to the sixth decimal place.

Another object is to provide such a recording differential refractometer in which the refractive index-temperature variation effect is reduced by a suitable corrective system to a negligible error factor.

A further object is to provide such a recording differential refractometer which continuously operates according to a "null balance" measurement rather than an electrical deflection of deviation measurement of the light beam shift.

Other aims and advantages of the invention will be apparent from the following description and appended claims.

Figure 1:
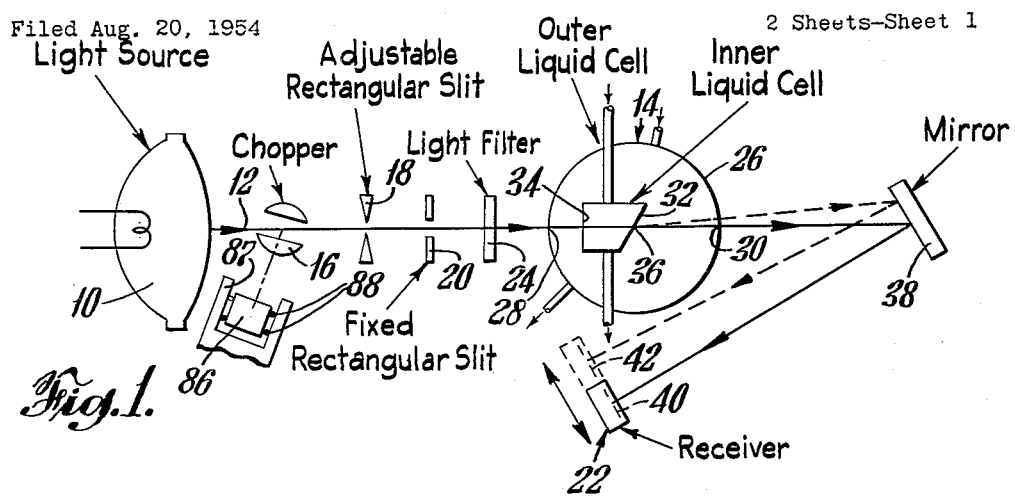
Fig. 1 is a schematic view of the optical system of a differential refractometer embodying the invention.
Figure 2:
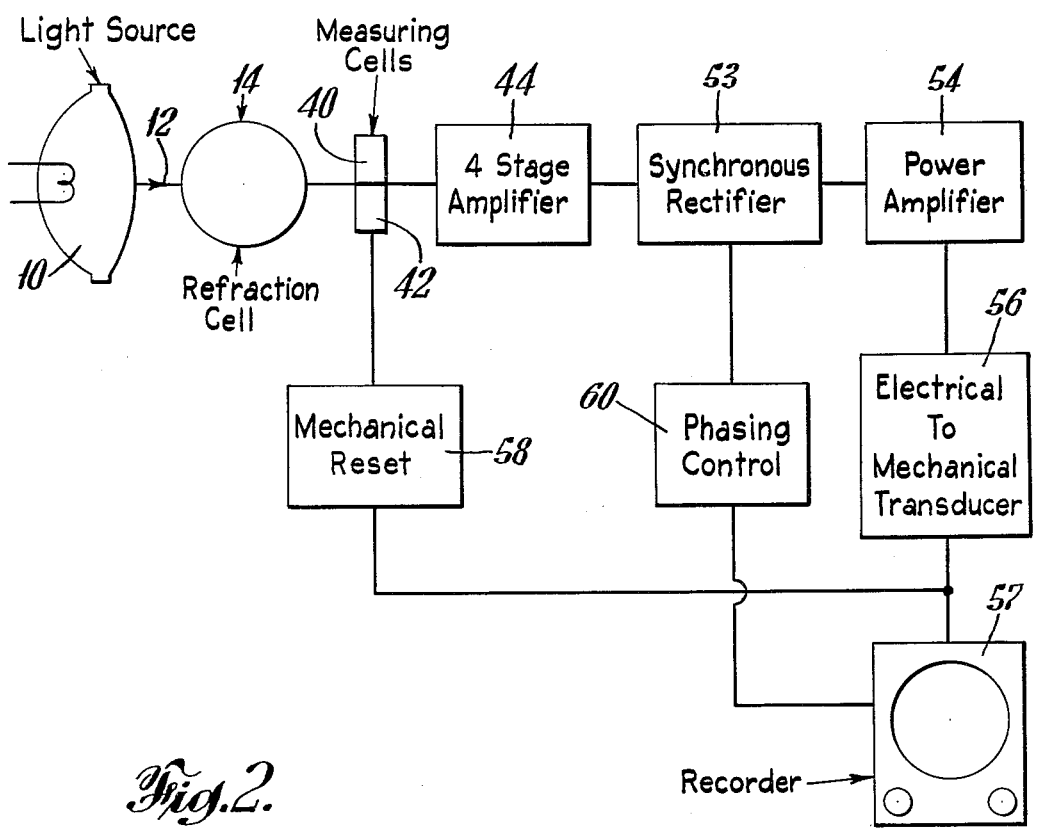
Fig. 2 is a block diagram of the electrical system of a differential refractometer embodying the invention.

In accordance with the present invention a recording differential refractometer is provided comprising light source means, light chopper means, light beam forming means, a refractometer cell assembly, and receiver means for indicating difference in refractive index.

More specifically, and with reference to the drawings, light source means 10 is provided for directing a beam of light 12 toward the refractometer cell assembly 14. Light chopping or interrupting means 16 is provided for chopping the light beam at regular intervals. Beam forming means 18 and 20 are provided for forming the radiant energy from source 10 into a narrow expanding wedge of light which is then passed through cell assembly 14 which acts as a cylindrical lens causing the wedge of light to converge as it passes to the receiver 22. A light filter 24 may also be provided in the path between source 10 and cell assembly 14. Cell assembly 14 comprises an outer cell 26 having optically opposed light inlet and light exit wall portions 28 and 30, respectively, pervious to the transmission of the wedge of light. Outer cell 26 is so formed and positioned that the light inlet portion 28 is normal to the entrant wedge of light at the region of light inlet, and that light exit portion 30 has a circular cross-section in the horizontal plane of light exit. An inner cell 32 is provided and is formed and positioned in the path of said wedge of light. Cell 32 has optically-opposed light inlet and light exit wall portions pervious to the transmission of the wedge of light. Inlet portion 34 is formed and positioned normal to the path of the wedge of light at the region of light inlet, and the exit light portion 36 is positioned, in the region of light outlet, on the geometric center of the circular exit portion 30 of cell 26.

In accordance with the construction of refractometer cell assembly 14, the entrant wedge of light remains unrefracted in its passage through inlet portion 28 of outer cell 26, in its passage through the fluid in cell 26, in its passage through inlet portion 34 of cell 32 and its passage through the fluid contained in cell 32. Upon passage through exit portion 36 of cell 32 the wedge of light is refracted, due to the difference in refractive indices of the fluids in the respective cells, and an angular shift in the wedge of light occurs. Since the exit portion of cell 32 in the region of light outlet is positioned at the geometric center of the circle of curvature of exit wall portion 30 of cell 26, the refracted wedge of light passing through exit portion 30 will in all cases be perpendicular to the wall portion 30 in the region of light outlet. Accordingly, no refraction will occur in the exit wedge of light at the exit portion 30 of cell 26 due to the differences in fluids on opposite sides of wall portion 30. Thus the only refraction occurring in the refractometer cell assembly 14 occurs at exit portion 36 of inner cell 32 and this refraction may be employed as a measure of the difference between the refractive indices of the fluids in the respective cells.

The wedge of light emerging from refractometer cell assembly 14 is directed against fixed plane mirror 38 and is reflected to the surfaces of movable receiver 22. Mirror 38 is employed to deflect the wedge of light in order to reduce the overall length of the refractometer, thereby permitting a sturdier and more compact construction.

Receiver 22 comprises two recangular photronic cells 40 and 42, electrically insulated from each other, and mounted as an assembly so as to move along a path parallel to the plane of mirror 38. Photronic cells 40 and 42 are connected with their output electrical signals in series opposition and the overall signal is fed to four-stage amplifier circuit 44.

The four stages of amplification, three of voltage amplification and one of power amplification, each consist of transistor element 46, collector resistance 47, base electrode circuit resistors 48, 49 coupling condensers 50 and by-pass condensers 51. An interstage transformer 52 is employed between the third and fourth stages of amplification.

The photronic cell assembly is mounted to move along a path until a position is achieved at which the wedge of light reflected from mirror 38 illuminates each cell equally. The output from four-stage amplifier 44 is fed to the input of synchronous rectifier 53, which transforms the alternating signal to a undirectional signal. The output of rectifier 53 is fed into power amplifier 54 which, in turn, feeds into the input of transducer 56.

A servo mechanism system is provided in a feedback loop to attain null-balance of the differential refractometer. Thus, for a change in refractive index of the liquid in one of the refractometer cells (the other remaining constant), the wedge of light reaching the receiver is angularly displaced due to a change in refraction of the wedge of light at light exit portion 36 of cell 32. Such a condition results in the production of an error signal at the output of receiver 22, which when amplified and rectified, serves to drive a reversible electric reset motor system 58 in the feedback loop which, in turn, moves the photronic cell assembly in a direction and to a position at which equal illumination of both photronic cells is restored. When such positioning is attained, the error signal will return to a zero value and a null-balance condition will be restored. The mechanical displacement required for the positioning of the photronic cell assembly is measured, the magnitude of the measurement being recorded by recorder 57, and calibrated in terms of the refractive index difference corresponding to the full scale range of the refractometer.

The movement of the photronic cell assembly necessary to balance out the error signal and restore null-balance conditions requires that the system have a sense of direction, since the error signal can be produced as a result of an increase or decrease in the refractive index of the liquid of varying refractive index. This directional sense is accomplished in the refractometer of the invention by the use of synchronous rectifier 53 and phase shifting mechanism 60. Synchronous rectifier 53 comprises a conventional demodulating network.

Synchronous rectifier circuit 53 comprises the series combination of the output transformer 62 of the four stage amplifier 44, crystal rectifier 64 and 66, resistors 68 and 70, and potentiometer 72. Resistors 74 and 76 by-pass rectifiers 64 and 66, respectively. Synchronizing voltage supply transformer 78 is provided in line 80 between the center tap of potentiometer and the center tap of transformer 62.

Thus, a direct current output signal is established across rectifier output terminals 82—83 which has a magnitude proportional to that of the error signal and a polarity determined by the phase of the rectifier signal input to that of the synchronizing reference voltage applied across terminals 84—85 of the synchronous rectifier circuit.

A synchronous motor 86 is employed to rotate light beam chopper 16 at a frequency identical to that of the synchronizing voltage applied to synchronous rectifier 53. It is, of course, necessary that the input signal to the synchronous rectifier have the proper (polarity) phase relationship with respect to the synchronizing voltage to impart a proper directional sense to the feedback loop. This may be accomplished by mounting the motor on a concentric clamp assembly 87 around the shaft bearings 88. Loosening the clamp allows one to rotate the motor axially with respect to the light beam. Therefore, when the light beam is being chopped and the motor is rotated a few degrees, the signal output from the electronic amplifier shifts a few electrical degrees. With the reference A. C. voltage supplying synchronous rectifier circuit 53 the same as the A. C. voltage to the synchronous motor, any phasing errors occurring up to the rectifier due to mechanical phase errors of the optical system and electrical phase errors in the electronic system can be corrected for by rotation of the chopper drive motor. For, by mechanically rotating the chopper drive motor, the phase of the signal unbalance appearing across the output transformer 62 shifts with respect to the voltage appearing across the synchronizing input transformer 78. In this manner for a given change of refractive index, the maximum value of error signal will be obtained which is the obvious desirable condition for measurement.

Figure 3:
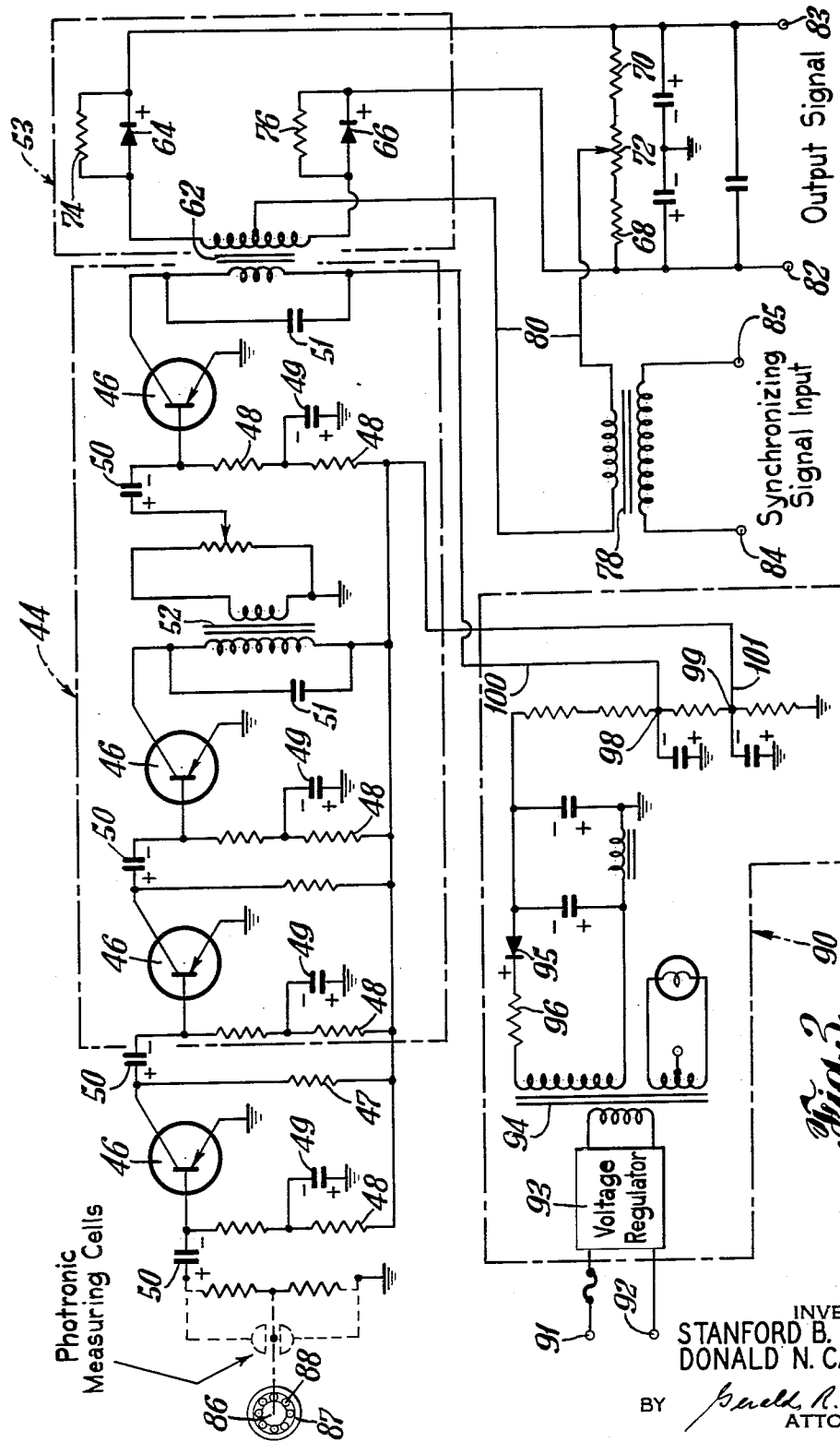
Fig. 3 is a wiring diagram of the amplifier, power supply and synchronous rectifier circuits of the differential refractometer shown schematically in the block diagram of Fig. 2.

A power supply 90, such as shown in Fig. 3 of the drawing, may be provided. As there shown, a source voltage is applied across lines 91—92 which is fed to the input voltage regulator 93. The output is fed through transformer 94 to a power rectifier circuit comprising rectifier 95, resistor 96 and output filter circuit 96. The two output voltages are taken off points 98 and 99 of a split output resistor and supplied to the synchronous rectifier and amplifier circuits, respectively, through lines 100 and 101.

The differential refractometer of the invention may be employed for making measurements under the following three conditions:

(1) The liquid in one measuring cell is stationary and of unknown refractive index while the liquid in the other cell is also stationary and of known refractive index;

(2) The liquid in one measuring cell is stationary and of known refractive index, while the liquid in the other measuring cell is a continuously flowing sample stream of unknown refractive index; and (3) The liquids in both measuring cells are continuously flowing and of unknown but substantially constant refractive index and the difference in their refractive indices is continuously measured.

When employing the null-balance method of measurement the reproducible sensitivity is represented by a refractive index difference of $3 \times 10^{-6}$. Because of this very high sensitivity, the measurement between liquids of almost identical refractive indices affords an excellent means for chemical process quality control.

In employing the differential refractometer of the invention it is possible to measure differences in refractive indices of two fluids by supplying one to outer cell 26 and the other to inner cell 32 of the refractometer cell assembly. Which of these fluids is supplied to the inner or outer cell is not of importance. It is only necessary that the temperatures of both fluids be substantially identical.

The exit surface 36 of inner cell 32 is the only surface in the entire cell assembly in which changes in temperature can effect the measurement. However, since the fluid passed through the outer cell 26 will have the same temperature and approximately the same refractive index and $$\frac{dn}{dt}$$

as the fluid in inner cell 32, there can be no error significant enough to effect a differential refractive index measurement in the sixth decimal place.

What is claimed is:

1. A differential refractometer for measuring the difference between the refractive indices of two liquids comprising, means for forming a wedge of light of controlled direction and dimensions; a first cell, positioned in said wedge of light, having optically opposed light inlet and light exit wall portions pervious to the transmission of said wedge of light therethrough, the surface of said light inlet portion being positioned normal to said wedge of light in the region of light inlet and said light exit wall portion being shaped to form a surface having equal circular cross-sections in the planes in which refraction of said wedge of light occurs; a second cell positioned in the path of said wedge of light, said second cell having optically-opposed light inlet and light exit wall portions pervious to the transmission of light therethrough, said inlet portion being positioned normal to the path of said wedge of light in the region of light inlet, said exit portion being positioned at the geometric center of said cross-sectional circles of said light exit portion of said first cell; means associated with said cells for passing said liquids thereto; and means responsive to the change in direction of said wedge of light emerging from said light exit portion of said first cell for correlating said change in direction of said emergent wedge of light with the change in the differential refractive index caused by a change in the refractive index of one of said liquids.

2. A differential refractometer for continuously measuring the difference between the refractive indices of a first liquid of substantially constant refractive index and a second liquid of varying refractive index comprising, means for forming a wedge of light of controlled direction and dimensions; a first cell positioned in said wedge of light and containing a quantity of said first liquid, said first cell having optically opposed light inlet and light exit wall portions pervious to the transmission of said wedge of light therethrough, the surface of said light inlet portion being positioned normal to said wedge light in the region of light inlet and said light exit wall portion being shaped to form a surface having equal circular cross-sections in the planes in which refraction of said wedge of light occurs; a second cell positioned in the path of said wedge of light, said second cell having optically-opposed light inlet and light exit wall portions previous to the transmission of light therethrough, said inlet portion being positioned normal to the path of said wedge of light in the region of light inlet, said exit portion being positioned at the geometric center of said cross-sectional circles of said light exit portion of said first cell; means associated with said second cell for continuously passing said liquid of varying refractive index therethrough; and means responsive to the change in direction of said wedge of light emerging from said light exit portion of said first cell for correlating said change in direction of said emergent wedge of light with the change in refractive index of said liquid of varying refractive index.

3. A differential refractometer in accordance with claim 1, wherein said means responsive to the change in direction of said wedge of light includes photronic cell assembly means capable of developing an output electric signal proportional to the change in direction of said wedge of light caused by said change in the refractive index of one of said liquids.

4. A differential refractometer for measuring the difference between the refractive indices of two liquids comprising, means for forming a wedge of light of controlled direction and dimensions; a first cell, positioned in said wedge of light, having optically-opposed light inlet and light exit wall portions pervious to the transmission of said wedge of light therethrough, the surface of said light inlet portion being positioned normal to said wedge of light in the region of light inlet and said light exit wall portion being shaped to form a surface having equal circular cross-section in the planes in which refraction of said wedge of light occurs; a second cell positioned within said first cell and in the path of said wedge of light, said second cell having optically-opposed light inlet and light exit wall portions pervious to the transmission of light therethrough, said inlet portion being positioned normal to the path of said wedge of light in the region of light inlet, said exit portion being positioned at the geometric center of said cross-sectional circles of said light exit portion of said first cell; means associated with said cells for passing said liquids thereto; photronic cell assembly means capable of developing an output electric signal proportional to the change in direction of said wedge of light caused by said change in the refractive index of one of said liquids, said photronic cell assembly means being moveable along the path of said change in direction of said wedge of light; and servo mechanism feedback means, responsive to said output electric signal, for returning said photronic cell assembly to a null-balance position of equal illumination of said photronic cells.

5. A differential refractometer in accordance with claim 4, wherein a synchronous light beam chopper is provided for chopping said wedge of light prior to its passage through said differential refractometer cell assembly.

6. A differential refractometer in accordance with claim 5, wherein means is provided for demodulating said electric output signal in synchronism with the chopping of said light beam.

7. A differential refractometer in accordance with claim 6, wherein said servo mechanism feedback means includes phase shifting means for insuring application of said output electric signal to said feedback means with the proper phase relationship to obtain a return of said photronic cell assembly to the null balance position.

8. A differential refractometer for continuously measuring the difference between the refractive indices of a first liquid of substantially constant refractive index and a second liquid of varying refractive index comprising, means for forming a wedge of light of controlled direction and dimensions; a first cell positioned in said wedge of light and containing a quantity of said first liquid, said first cell having optically-opposed light inlet and light exit wall portions pervious to the transmission of said wedge of light therethrough, the surface of said light inlet portion being positioned normal to said wedge light in the region of light inlet and said light exit wall portion being shaped to form a surface having equal circular cross-section in the planes in which refraction of said wedge of light occurs; a second cell positioned within said first cell and in the path of said wedge of light, said second cell having optically-opposed light inlet and light exit wall portions pervious to the transmission of light therethrough, said inlet portion being positioned normal to the path of said wedge of light in the region of light inlet, said exit portion being positioned at the geometric center of said cross-sectional circles of said light exit portion of said first cell; means associated with said second cell for continuously passing said liquid of varying refractive index therethrough; photronic cell assembly means capable of developing an output electric signal proportional to the change in direction of said wedge of light caused by said change in the refractive index of one of said liquids, said photronic cell assembly means being movable along the path of said change in direction of said wedge of light; and servo mechanism feedback means, responsive to said output electric signal, for returning said photronic cell assembly to a null-balance position of equal illumination of said photronic cells.

9. A differential refractometer in accordance with claim 8, wherein a synchronous light beam chopper is provided for chopping said wedge of light prior to its passage through said differential refractometer cell assembly.

10. A differential refractometer in accordance with claim 8, wherein means is provided for demodulating said electric ouput signal in synchronism with the chopping of said light beam.

11. A differential refractometer in accordance with claim 8, wherein said servo mechanism feedback means includes means for insuring application of said ouput electric signal to said feedback means with the proper phase relationship to obtain a return of said photronic cell assembly to the null balance position.

No references cited.